(12) United States Patent
Ishimasa

(10) Patent No.: US 8,974,129 B2
(45) Date of Patent: Mar. 10, 2015

(54) BARRIER DEVICE, LENS BARREL, AND IMAGING APPARATUS INCLUDING SAME

(71) Applicant: Canon Kabushiki Kaisha, Tokyo (JP)

(72) Inventor: Toru Ishimasa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 14/156,577

(22) Filed: Jan. 16, 2014

(65) Prior Publication Data
US 2014/0212122 A1 Jul. 31, 2014

(30) Foreign Application Priority Data

Jan. 28, 2013 (JP) .................................. 2013-012999

(51) Int. Cl.
G03B 17/00 (2006.01)
G03B 17/26 (2006.01)
G03B 9/14 (2006.01)

(52) U.S. Cl.
CPC ........................................ G03B 9/14 (2013.01)
USPC ........................................... 396/448; 359/511

(58) Field of Classification Search
CPC ............... G03B 9/14; G03B 9/10; G03B 9/08
USPC ........... 396/501, 448, 493, 495–497; 359/511
See application file for complete search history.

(56) References Cited

U.S. PATENT DOCUMENTS

| 8,317,416 | B2 | 11/2012 | Katano |
| 2010/0027986 | A1 | 2/2010 | Katano |
| 2011/0157699 | A1* | 6/2011 | Torii .............................. 359/511 |
| 2013/0155529 | A1 | 6/2013 | Ishimasa |

FOREIGN PATENT DOCUMENTS

JP 2010-39129 A 2/2010

* cited by examiner

*Primary Examiner* — Rochelle-Ann J Blackman
(74) *Attorney, Agent, or Firm* — Fitzpatrick, Cella, Harper & Scinto

(57) ABSTRACT

There is provided a barrier device including a main barrier blade and a sub barrier blade. In the operation range of the main barrier blade and the sub barrier blade, a portion of the contacting surface provided on the sub barrier blade that contacts on the main barrier blade is located within the operation range of the contacting surface provided on the main barrier blade that contacts on the sub barrier blade.

9 Claims, 14 Drawing Sheets

US 8,974,129 B2

BARRIER DEVICE, LENS BARREL, AND IMAGING APPARATUS INCLUDING SAME

BACKGROUND OF THE INVENTION

1. Field of the Invention

The present invention relates to a barrier device, a lens barrel, and an imaging apparatus including the same.

2. Description of the Related Art

There has been proposed a lens barrel including a barrier device (barrier mechanism) provided in front of a photographic lens. The barrier device shields or opens the photographic lens when an imaging apparatus is shifted to a photographing state or a collapsed (retracted) state. For example, there has been proposed a barrier mechanism that includes a barrier member having two pairs of blade members (one pair is large and the other is small) attached to the front of the photographic lens such that the blades can be opened and closed, and a barrier driving unit that opens and closes the barrier member.

Japanese Patent Laid-Open No. 2010-39129 discloses a barrier device for a camera including first and second blade members, first and second engaging portions provided on a driving member, and first and second biasing members.

However, in the barrier device disclosed in Japanese Patent Laid-Open No. 2010-39129, closing springs each corresponding to a main barrier blade and a sub barrier blade are required, and this increases the number of components. In addition, this barrier device requires setting of the balance for the springs, which makes the structure complex. Further, in this barrier device, unnecessary friction is caused between the main barrier blade and the sub barrier blade when the barrier is opened and closed. Furthermore, in this barrier device, the wider angle the lens has, the larger the opening diameter of the barrier becomes. This decreases the space for the blade members and the opening springs therefor, and makes it difficult to secure enough fitting length for the rotary shaft of the blade members, resulting in easy detachment of the blade members during assembly.

SUMMARY OF THE INVENTION

The present invention provides a barrier device that can reduce the number of components, and allows the opening and closing operation of the barrier with a simple configuration.

A barrier device according to one aspect of the present invention comprises: first and second shielding members configured to be shifted between a closed state in which a lens is shielded and an open state in which the lens is exposed; and a driving member configured to drive the first and second shielding members to be shifted to the closed or open state. A portion of a first contacting surface which contacts on a first shielding member is located within the operation range of a second contacting surface that contacts on the second shielding member, the first contacting surface being included in the second shielding member and the second contacting surface being included in the first shielding member.

The barrier device according to the present invention can reduce the number of components, and allows the opening and closing operation of the barrier with a simple configuration.

Further features of the present invention will become apparent from the following description of exemplary embodiments (with reference to the attached drawings).

DESCRIPTION OF THE EMBODIMENTS

Figure 1:
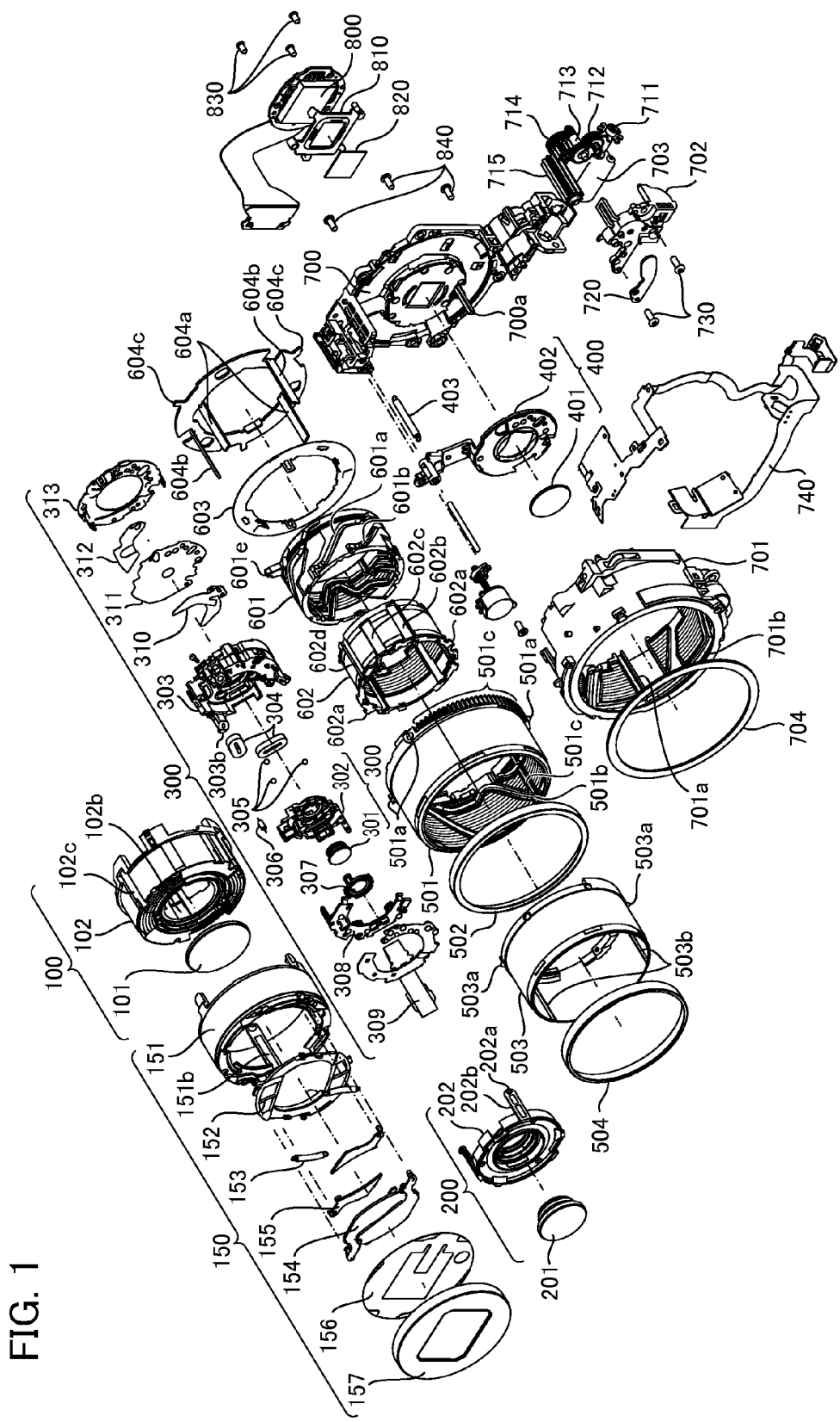
FIG. 1 is an exploded perspective view of a lens barrel.
Figure 2:
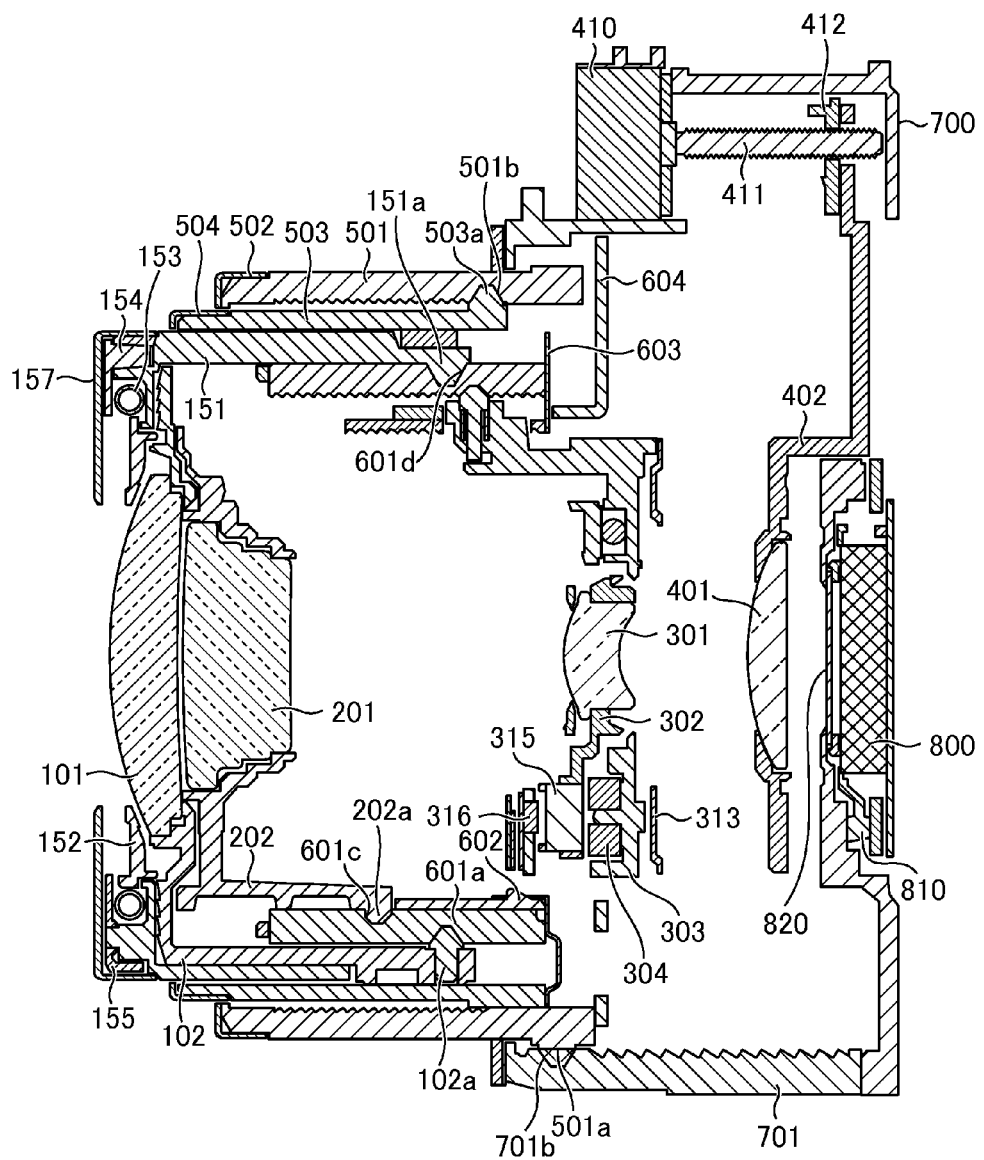
FIG. 2 is a cross-sectional view of a lens barrel in a photographing state.
Figure 3:
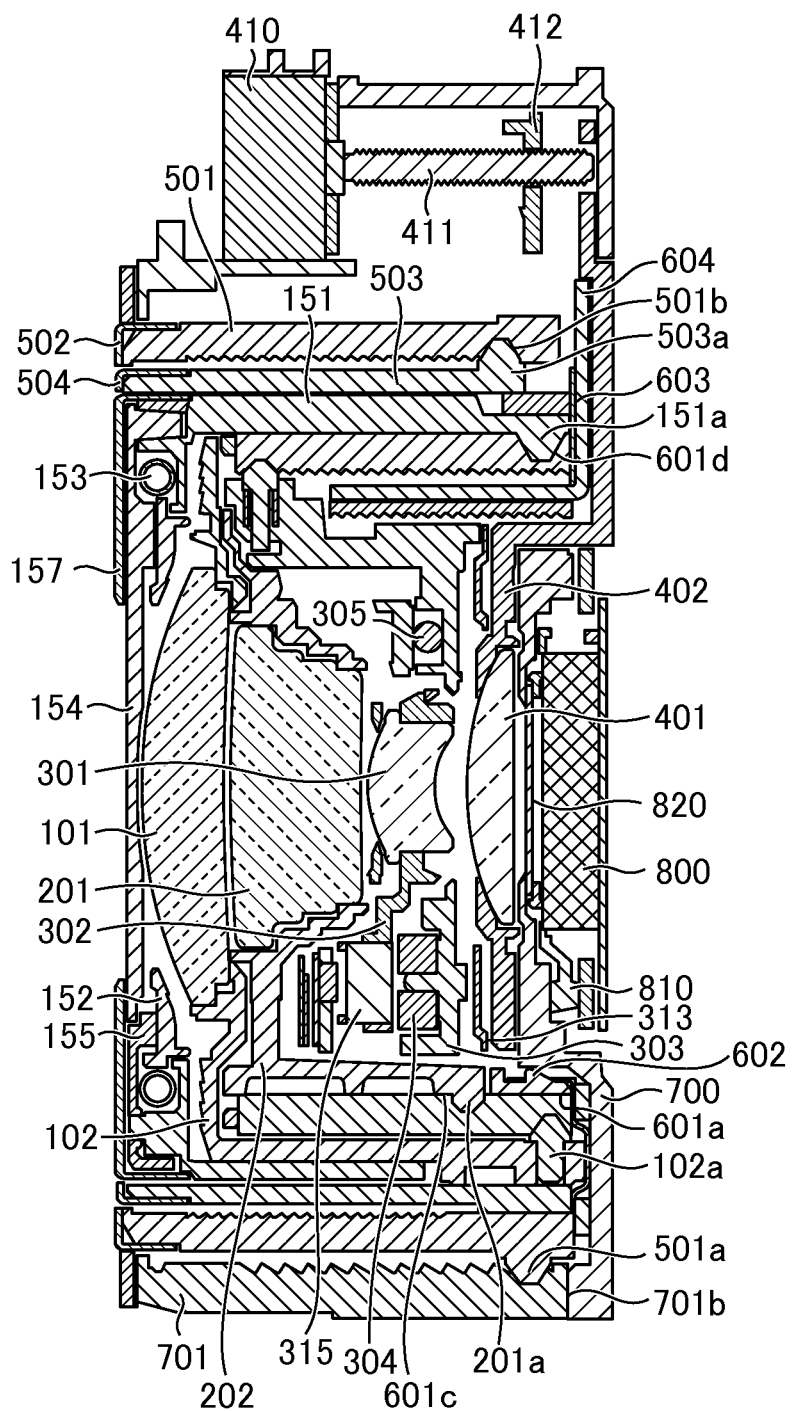
FIG. 3 is a cross-sectional view of a lens barrel in a collapsed state.

A configuration example of a lens barrel including a barrier device according to the present embodiment will be described below with reference to FIG. 1 to FIG. 3. FIG. 1 is an exploded perspective view of the lens barrel. FIG. 2 is a cross-sectional view of the lens barrel in a photographing state. FIG. 3 is a cross-sectional view of the lens barrel in a collapsed state. An imaging apparatus according to the present embodiment includes the lens barrel shown in FIG. 1 to FIG. 3.

A first lens group 100 has a first lens 101 and a cylindrical first lens frame 102 that holds the first lens 101. Cam pins 102a that inwardly project in the radial direction and are equi-angularly spaced in the inner peripheral direction, and a keyway 1 that limits the rotation of the first lens group 100 are provided on the inner peripheral surface of the first lens frame 102. In addition, the keyways 102c that limit the rotation of the barrier group are provided at equal angular intervals on the outer peripheral surface of the first lens frame 102. Note that the first lens 101 and the first lens frame 102 are constructed separately in the present embodiment, but they may be constructed integrally.

The barrier group 150 is the barrier device according to the present embodiment. The barrier group 150 includes a barrier cylinder 151, a barrier drive ring 152, a barrier opening spring 153, a main barrier blade 154, a sub barrier blade 155, a cap adhesive tape 156, and a cap 157. The cap 157 is a cover attached on the object side of the barrier cylinder 151 with the cap adhesive tape 156.

Cam pins 151a that inwardly project in the radial direction and are equi-angularly spaced in the inner peripheral direction, and a rectilinear key 151b that limits the rotation of the barrier group 150 are provided on the inner peripheral surface of the barrier cylinder 151.

A second lens group 200 has a second lens 201 and a cylindrical second lens frame 202 that holds the second lens 201. Cam pins 202a that outwardly project in the radial direction and are provided at equal angular intervals in the outer peripheral direction, and a rectilinear key 202b that limits the rotation of the second lens group 200 are provided on the outer peripheral surface of the second lens frame 202.

A third lens group 300 includes a shutter blade 310, which is a light quantity adjusting member, an ND filter 312, a separate sheet 311, a shutter cover 313, and a shutter actuator on the imaging surface side of a third group base 303. An image shake correcting coil 304, a rolling ball 305, a third lens frame 302, a third lens 301, a spring 306, and a cap 307 are provided on the object side of the third group base 303. An image shake correcting holder 308, an FPC 309, and a position detection sensor 316 fixed to the FPC 309 are also provided on the object side of the third group base 303. The third lens frame 302 holds the third lens 301. In addition, the cap 307 that limits light quantity is attached to the third lens frame 302 on the object side.

The third lens frame 302 also holds an image shake correcting magnet 315. In addition, the third lens frame 302 is held on the third group base such that it can be moved by the action of the ball 305 and the spring 306. Further, the third lens frame 302 is moved to any location in the direction orthogonal to the optical axis of an imaging optical system by a driving force generated by the action of the image shake correcting coil 304 and the image shake correcting magnet 315, and its position is controlled by the position detection sensor 316.

A rectilinear cylinder 602 is provided in the inside of the first lens frame 102. The rectilinear cylinder 602 is rotatable relative to a cam cylinder 601 while its movement is limited by a rectilinear plate 604. In addition, the rectilinear cylinder 602 limits the rotation of the first lens group 100, the second lens group 200, and the third lens group 300, and linearly guides the movement of the first lens group 100, the second lens group 200, and the third lens group 300 in the optical axis direction.

A keyway 602d is provided on the outer peripheral surface of the rectilinear cylinder 602. The keyway 602d is fit to the rectilinear keys 604a of the rectilinear plate 604, and also limits the rotation of the rectilinear plate 604. In addition, a rectilinear key 602a is provided on the object side of the rectilinear cylinder 602. The rectilinear key 602a is fit into the keyway 102b of the first lens frame 102.

In addition, a through-keyway 602b that limits the rotation of the rectilinear key 202b of the second lens frame 202, and a through-keyway 602c that limits the rotation of a rectilinear key 303b of the third group base 303 are provided at equal angular intervals on the inner peripheral surface of the rectilinear cylinder 602. A shielding plate 603 that shields adverse light is attached to the imaging surface side of the rectilinear cylinder 602.

The outer peripheral surface of the rectilinear cylinder 602 is fit to the inner surface of the cam cylinder 601. In addition, the outer peripheral surface of the rectilinear cylinder 602 is bayonet-coupled with the cam cylinder 601 so as to be held rotatably relative to the cam cylinder 601.

The rectilinear keys 604a that are fit into the keyway 602d of the rectilinear cylinder 602 extending in the optical axis direction, and a rectilinear key 604b that is fit into the keyway of a cover cylinder 503 are provided on the rectilinear plate 604. In addition, the outer periphery having the circular shape of the rectilinear plate 604 is bayonet-coupled with a cam cover 501 so as to be held rotatably relative to the cam cover 501. Further, rectilinear keys 604c, which are fit into keyways 701a provided on the inner peripheral surface of a fixed cylinder 701 and whose linear movement is limited, are provided at equal angular intervals on this outer periphery.

The cover cylinder 503 is provided on the outer periphery of the cam cylinder 601. The rotation of the cover cylinder 503 is limited by the rectilinear plate 604, to thereby advance and retreat in the optical axis direction by the cam cover 501. A keyway that is fit to the rectilinear key 604b of the rectilinear plate 604 is provided on the inner peripheral surface of the cover cylinder 503. Cam pins 503a are also provided on the outer peripheral surface of the cover cylinder 503. The cam pins 503a are provided at equal angular intervals in the outer peripheral direction of the cover cylinder 503, outwardly project in the radial direction of the cover cylinder 503, and are inserted into cam grooves 501b provided on the inner surface of the cam cover 501. In addition, a cam cover ring 504, which not only reinforces but also decorates the cam cover 501, is attached to the object side of the cover cylinder 503.

Cam pins 501a and a gear portion 501c that couples with a fifth gear are provided on the outer peripheral surface of the cam cover 501. The cam pins 501a are provided at equal angular intervals in the outer peripheral direction of the cam cover 501 and outwardly project in the radial direction of the cam cover 501 as well as being inserted into cam grooves 701b provided on the inner peripheral surface of the fixed cylinder 701. The cam grooves 501b, into which the cam pins 503a of the cover cylinder 503 are inserted, are provided at equal angular intervals on the inner peripheral surface of the cam cover 501. In addition, a keyway that is fit to the rotation key 601e of the cam cylinder 601 is provided on this inner peripheral surface. Further, a cam cylinder ring 502, which not only reinforces but also decorates the cam cylinder 601, is attached to the object side of the cam cover 501.

Cam groove 601c into which the cam pin 202a of the second lens frame 202 is inserted, and cam groove 601d into which the cam pin 303a of the third group base 303 is inserted are provided at equal angular intervals on the inner peripheral surface of the cam cylinder 601.

Cam groove 601a into which the cam pin 102a of the first lens frame 102 is inserted, and cam groove 601b into which cam pin 151a of the barrier cylinder 151 is inserted are provided at equal angular intervals on the outer peripheral surface of the cam cylinder 601. The rotation key 601e that is fit into the keyway of the cam cover 501 is also provided on this outer peripheral surface.

The cam cylinder 601 is bayonet-coupled with the cover cylinder 503 so as to be held rotatably relative to the cover cylinder 503 by the action of the rectilinear cylinder 602, the rectilinear plate 604, and the cam cover 501. In addition, the cam cylinder 601 advance and retreat in the optical axis direction by the action of cam cover 501. The fixed cylinder 701 is disposed on the outer periphery of the cover cylinder 503.

The keyways 701a which are fit to the rectilinear keys 604c of the rectilinear plate 604 and limit the rotation thereof, and the cam grooves 701b into which the cam pins 501a of the cam cover 501 are inserted are provided at equal angular intervals on the inner peripheral surface of the fixed cylinder 701. In addition, a grit prevention sheet 704 for preventing the entry of foreign matter into the lens barrel is disposed on the object side of the fixed cylinder 701.

A sensor holder 700 holds the driving source 410 of a fourth lens group 400, the main guide 404 of the fourth lens group 400, the driving source 703 of the lens barrel, and gears 711 to 715 that transmit the power of the driving source 703 to the cam cover 501.

The gears 711 to 714 are held on the sensor holder 700 with a gear cover 702. Note that a member 720 is attached to the gear cover 702 with a screw 730. The gear 715 as the fifth gear is held on the fixed cylinder 701 and the sensor holder 700.

The fourth lens group 400 includes a fourth lens 401 and a fourth lens holding frame 402. The rotation of the fourth lens group 400 is limited by the main guide 404 and sub guide 700a provided on the sensor holder 700. In addition, the fourth lens group 400 is threadedly engaged with a screw 411 provided on the driving source 410. Then, the fourth lens group 400 is disposed in a movable state in the optical axis direction by the effects of a nut 412 advancing and retreating in the optical axis direction by rotation of the driving source 410, and of a spring 403 that makes a lens frame 402 to contact with the nut 412.

When an imaging sensor 800 is fixed to the sensor holder 700, a protective glass 820 is fixed so as to press to the sensor holder 700 using the elasticity of a sensor rubber 810. The lens barrel is unitized by fixing the sensor holder 700 and the fixed cylinder 701 to each other with a screw 840. Note that reference numeral 830 in FIG. 1 denotes the screws behind the imaging sensor. In addition, reference numeral 740 denotes a flexible printed board.

When the lens barrel is shifted from the collapsed state to the photographing state, firstly, the gears 711 to 715 are rotated by the power from the driving source 703, to thereby rotationally drive the cam cover 501. The cam cover 501 is fit into the inside of the fixed cylinder 701, and is extended while being rotated in the optical axis direction by the action of the cam groove 701b provided in the inside thereof. When the cam cover 501 is rotated, the cam cylinder 601 is extended while being rotated in the optical axis direction by the action of the cam cover 501, the rectilinear plate 604, the rectilinear cylinder 602 and the cover cylinder 503.

The rectilinear cylinder 602 is held in rotatable state relative to the cam cylinder 601 by bayonet-coupling. In addition, the rotation of the rectilinear cylinder 602 is limited by the rectilinear plate 604. Therefore, when the cam cylinder 601 is rotated, the rectilinear cylinder 602 is extended while being linearly moved in the optical axis direction.

The first lens group 100, the barrier group 150, the second lens group 200, and the third lens group 300, which are coupled to the cam cylinder 601 with cams, are extended while being linearly moved in the optical axis direction by the action of the cam cylinder 601 and the rectilinear cylinder 602.

In addition, the fourth lens group 400 is held in a movable state in the optical axis direction by the action of the screw 411 and the nut 412 provided on the driving source 410. Furthermore, the rotation of the fourth lens group 400 is limited by the main guide 404 and the sub guide 700a, and is extended while being linearly moved in the optical axis direction independent of the movement of the cam cylinder 601.

With the above configuration, when the cam cover 501 is rotated, each lens group is extended from a collapsed position toward the object side and therefore the lens barrel is shifted from the collapsed state to the photographing state.

Note that a distance between the lens groups of the lens barrel is appropriately adjusted by the action of the fixed cylinder 701, the cam cover 501, and the cam cylinder 601, to thereby perform zooming.

Figure 4A:
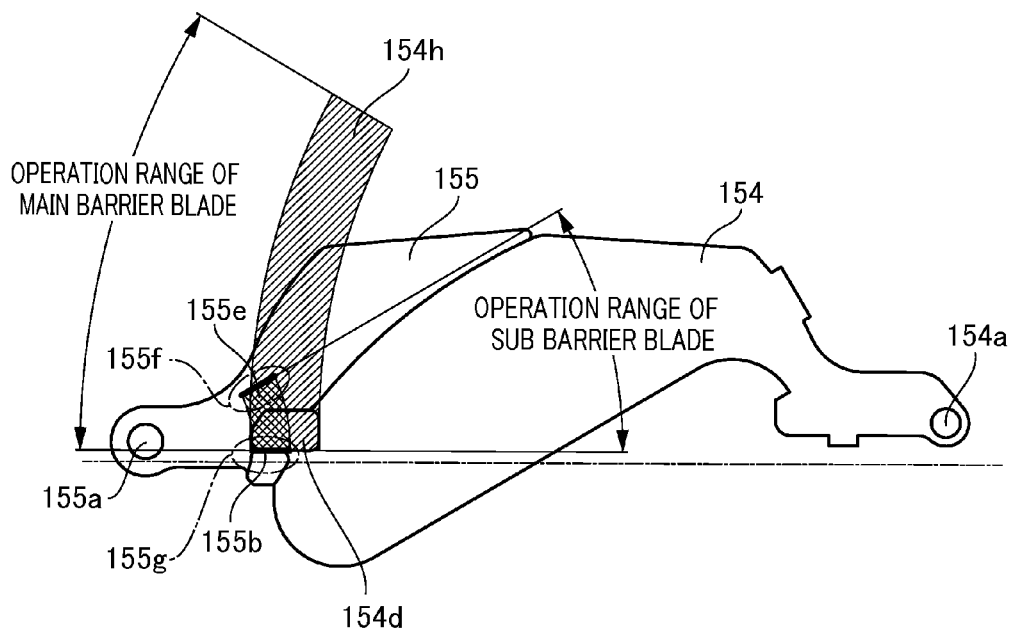
FIGS. 4A and 4B are views illustrating the positional relationship between a main barrier blade and a sub barrier blade in a closed state and an open state respectively.
Figure 4B:
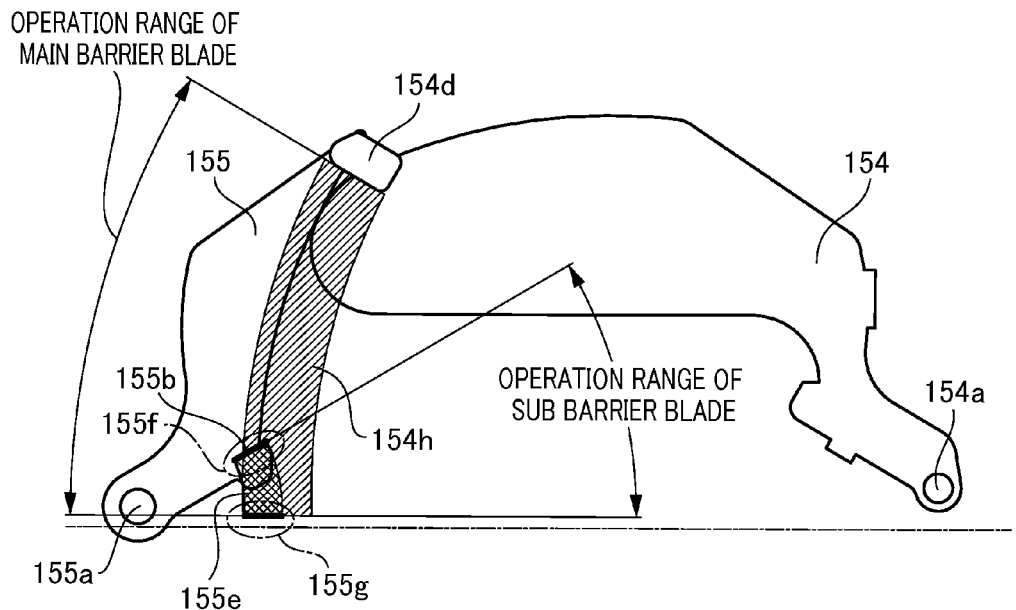
Figure 5:
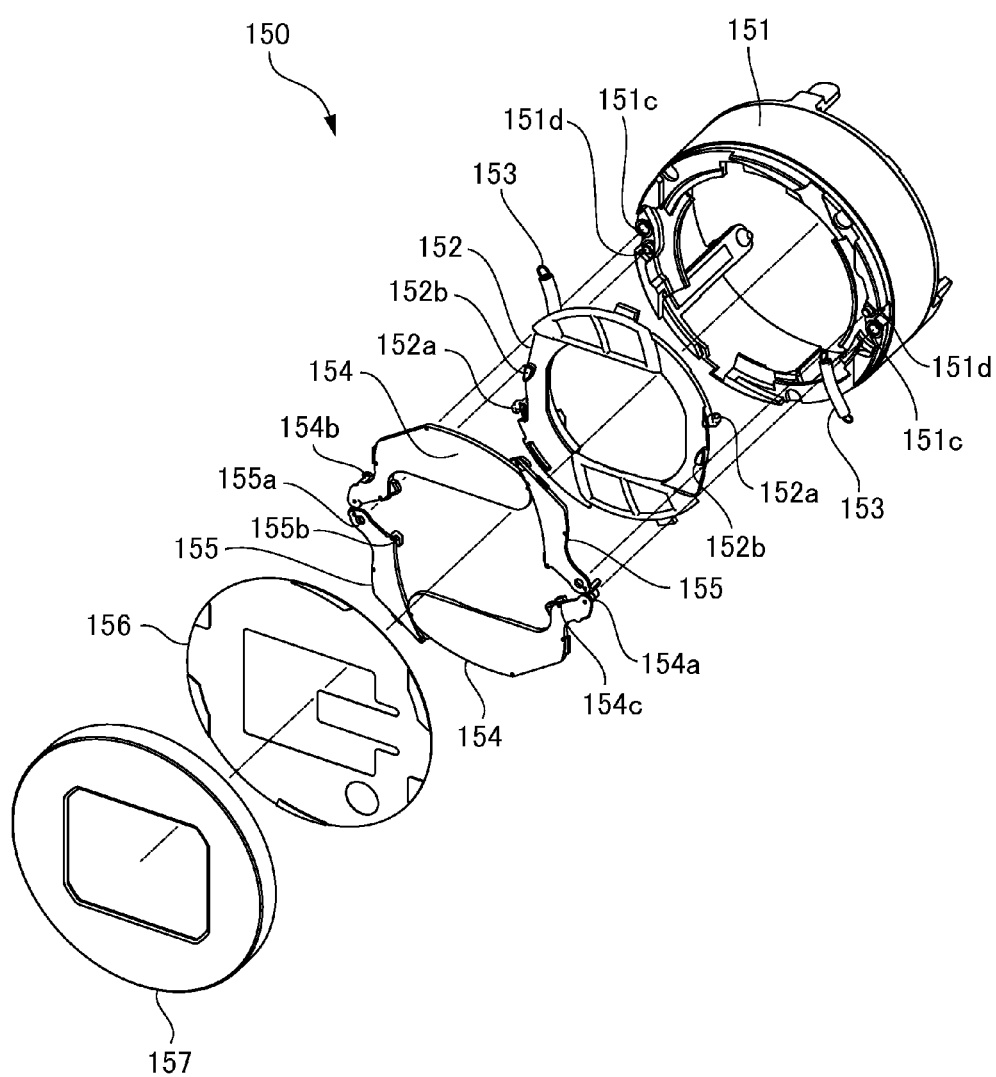
FIG. 5 is an exploded perspective view of a barrier group.
Figure 6:
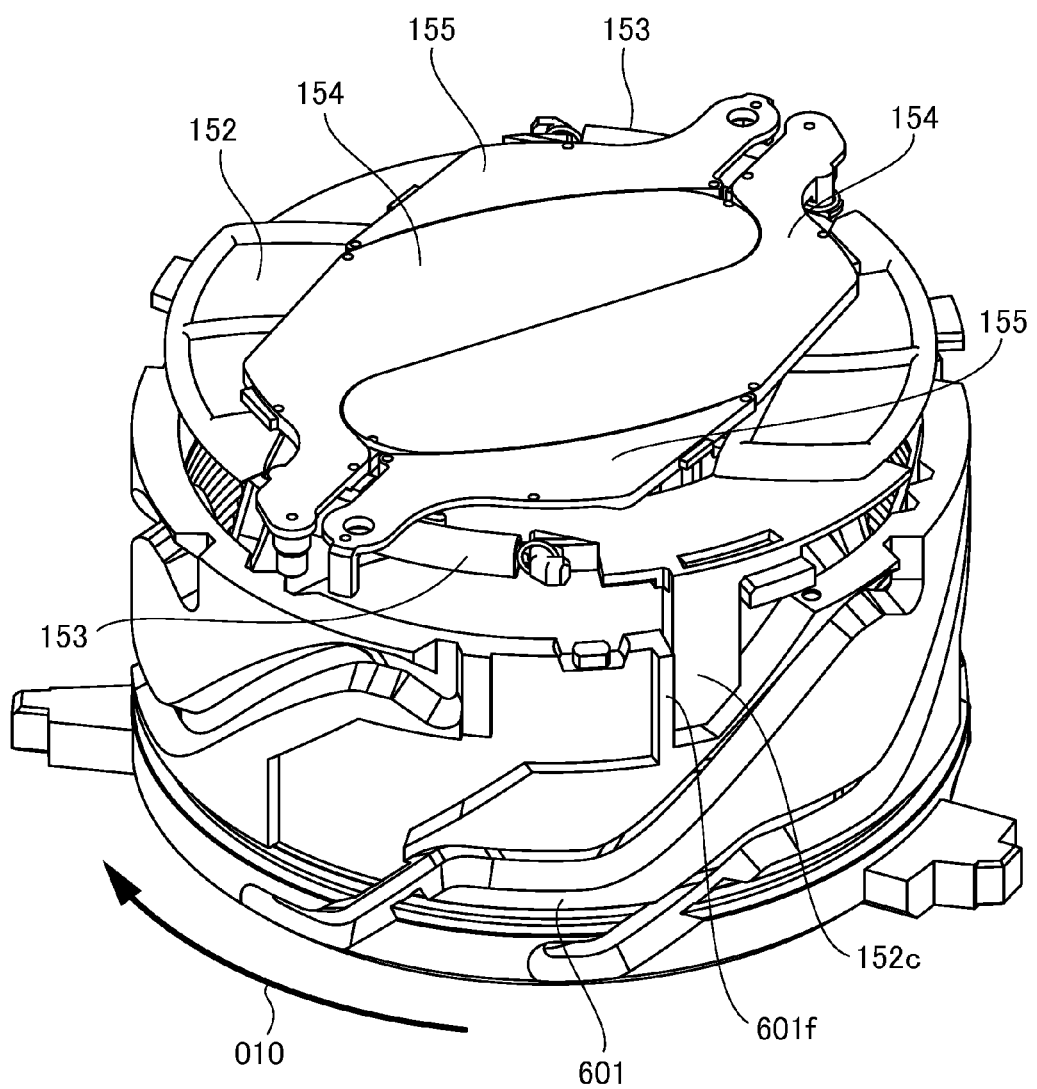
FIG. 6 is a perspective view of a barrier group in a closed state.
Figure 7:
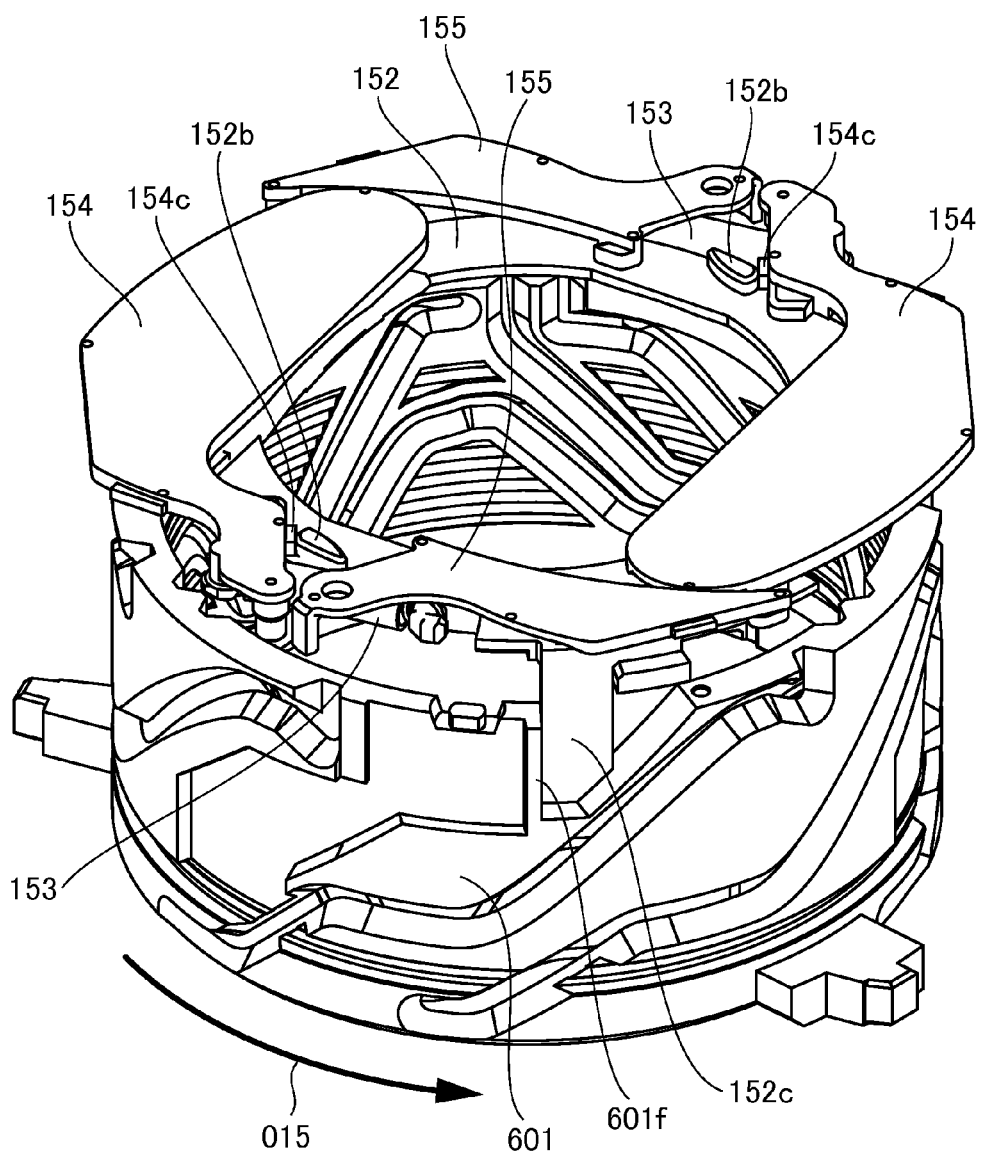
FIG. 7 is a perspective view of a barrier group in an open state.
Figure 8:
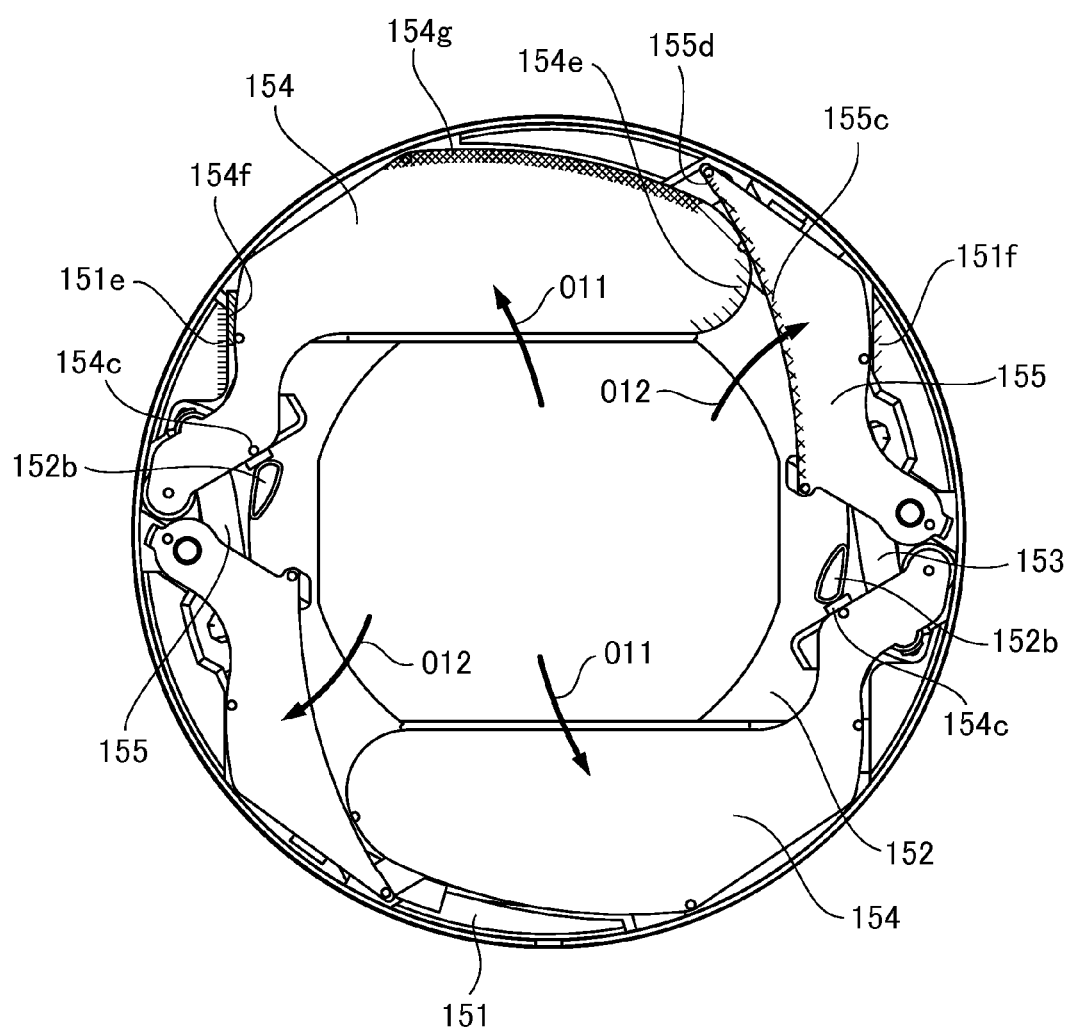
FIG. 8 is a front view of a barrier group in an open state.
Figure 9A:
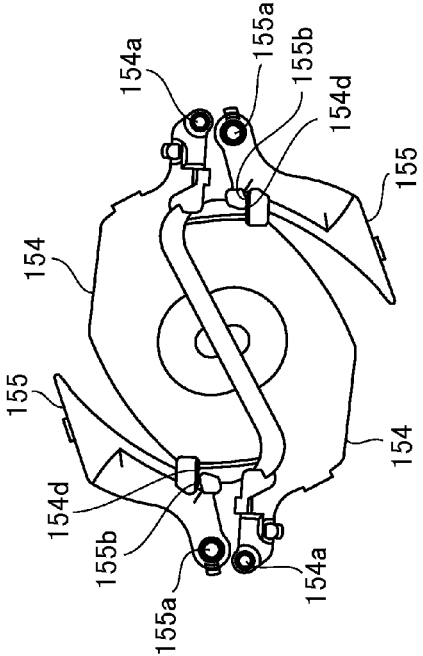
FIGS. 9A to 9D are views illustrating a movement of a barrier group from a closed state to an open state.
Figure 9B:
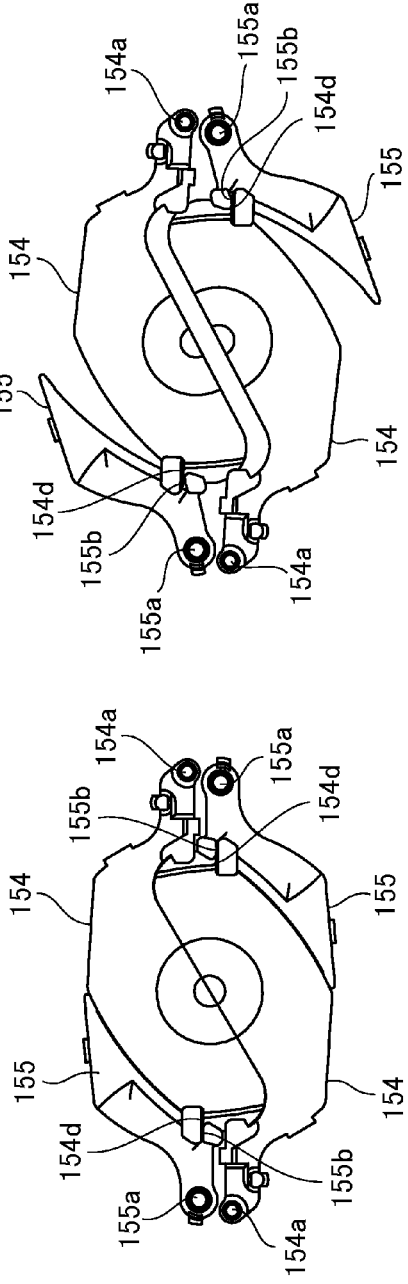
Figure 9C:
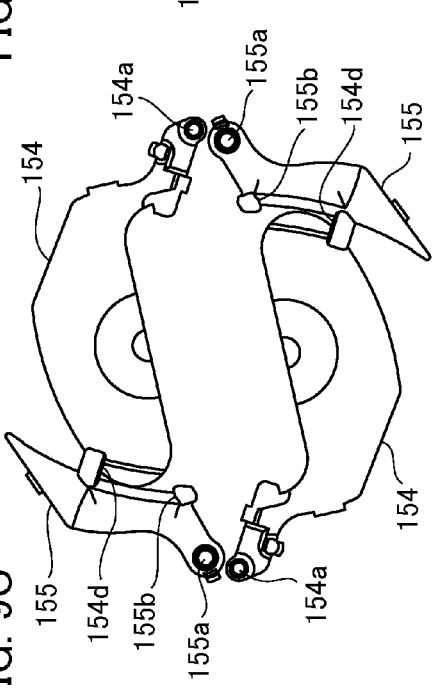
Figure 9D:
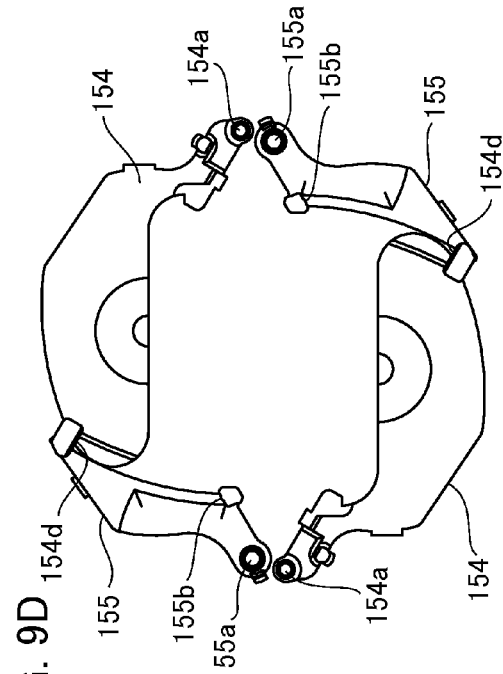
Figure 10:
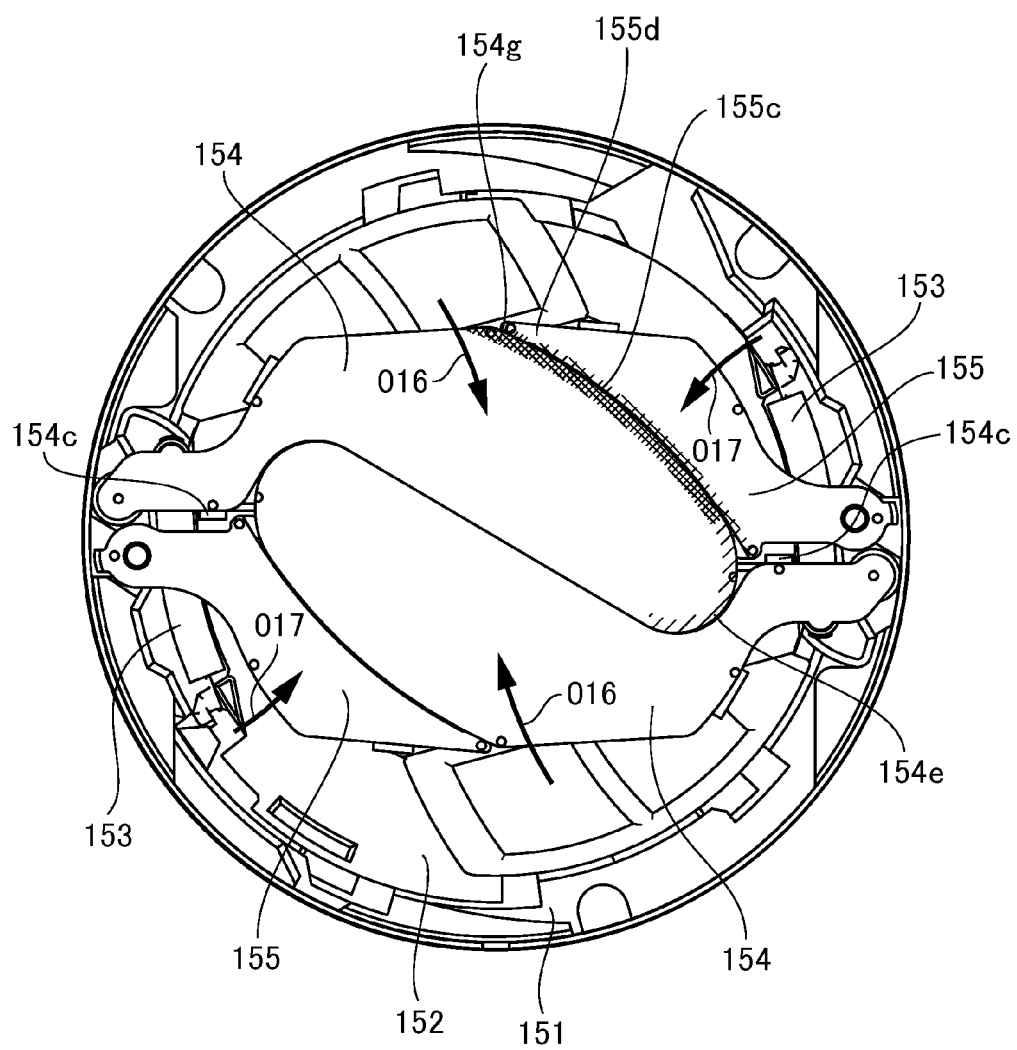
FIG. 10 is a front view of a barrier group in a closed state.

Next, with reference to FIGS. 4A and 4B to FIG. 10, the opening and closing operation of the barrier according to the present embodiment will be described. FIGS. 4A and 4B are views illustrating the positional relationship between the main barrier blade and the sub barrier blade in a closed state and an open state respectively. FIG. 4A shows the positional relationship between the main barrier blade and the sub barrier blade in the closed state. FIG. 4B shows the positional relationship between the main barrier blade and the sub barrier blade in the open state. FIG. 5 is an exploded perspective view of the barrier group. FIG. 6 is a perspective view of the barrier group in the closed state. FIG. 7 is a perspective view of the barrier group in the open state. FIG. 8 is a front view of the barrier group in the open state. FIGS. 9A to 9D are views illustrating a movement from the closed state to the open state of the barrier group. FIG. 10 is a front view of the barrier group in the closed state.

Rotation holes 151c into which the rotary shafts 154a of the main barrier blades 154 are inserted, and rotary shafts 151d which are inserted into the rotation holes 155a of the sub barrier blades 155 are provided at two positions opposite to each other across the optical axis on the object side of the barrier cylinder 151.

The main barrier blade 154 which is the first shielding member is shifted between the closed state in which the lens (first lens 101) is shielded and the open state in which the lens is exposed. A rotary shaft 154a, a spring locking portion 154b, a plane portion 154c, a contacting surface 154d, a tip portion 154e, and a matching surface 154g are provided on the main barrier blade 154. The plane portion 154c contacts on the contacting portion 152b of the barrier drive ring 152. The contacting surface 154d contacts on the contacting surface 155b of the sub barrier blade. The contacting surface 155b functions as the first contacting surface, while the contacting surface 154d functions as the second contacting surface. When the rotary shaft 154a is inserted into the rotation hole 151c of the barrier cylinder 151, the main barrier blade 154 is rotatably held on the barrier cylinder 151.

The sub barrier blade 155 which is the second shielding member is shifted between the closed state in which the lens (first lens 101) is shielded and the open state in which the lens is exposed. The rotation hole 155a into which the rotary shaft 151d provided on the barrier cylinder 151 is inserted and the contacting surface 155b which contacts on the contacting surface 154d of the main barrier blade 154 are provided on the sub barrier blade 155. When the rotary shaft 151d of the barrier cylinder 151 is inserted into the rotation hole 155a, the sub barrier blade 155 is rotatably held on the barrier cylinder 151. That is, the barrier cylinder 151 functions as a shielding cylinder that rotatably holds the main barrier blade 154 and the sub barrier blade 155.

The barrier drive ring 152 is rotatably mounted on the front of the barrier cylinder 151 by bayonet coupling such that it is rotated interlocking with the rotation of the cam cylinder 601. Therefore, the barrier drive ring 152 is rotated interlocking with the rotation of the cam cylinder 601. In addition, spring hooking portions 152a and the contacting portions 152b that contact the main barrier blades 154 project in the peripheral direction and are provided at two positions opposite to each other across the optical axis on the barrier drive ring 152.

The barrier drive ring 152 is rotatably mounted on the front of the barrier cylinder 151 such that it is rotated interlocking with the rotation of the cam cylinder 601. In addition, the spring hooking portions 152a are projected at two corresponding positions in the diametrical direction on the barrier drive ring 152.

The opening spring 153 is bridged between the spring locking portion 154b of the main barrier blade 154 and the spring hooking portion 152a of the barrier drive ring 152. The opening spring 153 is an extension coil spring (for example, a coil spring). With such a configuration, a rotation power is applied in the direction of the barrier drive ring 152 that opens the main barrier blade 154 (barrier opening direction) as shown by the arrow 010 in FIG. 6 relative to the main barrier blade 154 by the opening spring 153.

Both of the main barrier blade 154 and the sub barrier blade 155 are configured to cover the front of the first lens 101 using two sets of the blades, each set having the same shape, when the lens barrel is collapsed. The main barrier blade 154 is mounted such that the rotary shaft 154a thereof is fit into the rotation hole 151c provided on the front of the barrier cylinder 151 and is rotated around the rotary shaft 154a so as to allow the opening and closing operation of the barrier. In addition, the sub barrier blade 155 is mounted such that the rotation hole 155a thereof is fit to the rotary shaft 151d provided on the front of the barrier cylinder 151 and is rotated around the rotary shaft 151d so as to allow the opening and closing operation of the barrier.

Next, the configuration for opening and closing the main barrier blade 154 and the sub barrier blade 155 in the lens barrel will be described in detail.

The barrier drive ring 152 is formed into a substantially annular shape, and an interlocking portion 152c that extends from the outer peripheral surface thereof and bends into an L-shape is provided integrally therewith. When the lens barrel is collapsed, a barrier driving portion 601f provided on the front side (the object side) of the cam cylinder 601 contacts the interlocking portion 152c. When the barrier is shifted from the closed state to the open state, the interlocking portion 152c of the barrier drive ring 152 contacts the barrier driving portion 601f by an opening biasing force of the opening spring 153 so as to rotate the barrier in the barrier opening direction as shown by the arrow 010 in FIG. 6.

A contacting surface 152b is provided on the barrier drive ring 152. When the barrier is opened, the contacting surface 152b contacts the plane portion 154c of the main barrier blade 154. Thus, the rotational movement of the barrier drive ring 152 is transmitted to the main barrier blade 154 to cause the main barrier blade 154 to be opened in the direction shown by the arrow 011 in FIG. 8.

On the other hand, when the sub barrier blade 155 is shifted from the closed state to the open state, a matching surface 155c that contacts with the main barrier blade 154 is pushed away by the tip 154e of the main barrier blade 154. This causes the sub barrier blade 155 to be opened in the direction shown by the arrow 012 in FIG. 8. In the present embodiment, since the sub barrier blade 155 is not biased by rotation, the main barrier blade 154 can be shifted from the closed state to the opening operation without being prevented from its opening operation. For example, the main barrier blade 154 and the sub barrier blade 155 are shifted from the closed state shown in FIG. 9A to the states shown in FIGS. 9B and 9C sequentially, and finally to the open state shown in FIG. 9D. Specifically, the when the matching surface 155c is pushed away by the tip of the main barrier blade 154 that is rotated to the open state by the barrier drive ring 152, sub barrier blade 155 is rotated so as to be shifted from the closed state to the open state. Thus, the barrier drive ring 152 functions as the driving member that drives the main barrier blade 154 and the sub barrier blade 155 so as to be shifted to the closed or open state.

The contacting surface 155b that contacts the contacting surface 154d provided at the blade tip of the main barrier blade 154 is provided near the rotation hole 155a of the sub barrier blade 155. Therefore, during the opening and closing operation of the barrier blade, even when the opening operation of the main barrier blade 154 causes the sub barrier blade 155 to be pushed open, it cannot be opened too widely because the contacting surface 155b serves as a stopper.

In the open state of the barrier, the main barrier blade 154 keeps the open state by the action of the opening spring 153 which makes the stopper 154f of the main barrier blade 154 contact the stopper 151e of the barrier cylinder 151.

The sub barrier blade 155 is held such that it can be rotated without being biased by the main barrier blade 154, between the tip 154e of the main barrier blade 154 and the stopper 151f provided on the barrier cylinder. This maintains the open state.

Next, when the barrier is shifted from the open state to the closed state, the barrier driving portion 601f of the cam cylinder 601 causes the barrier drive ring 152 to be rotated in the closing direction (barrier closing direction; direction of the arrow 015 in FIG. 7) against a biasing force in the opening direction of the opening spring 153. Specifically, during the collapsing operation of a camera, the barrier driving portion 601f of the cam cylinder 601 that is rotated by a rotation driving force transmitted from the driving source 703 pushes the interlocking portion 152c to rotate the barrier drive ring 152 in the barrier closing direction. At this time, the plane portion 154c and the contacting surface 152b of the barrier drive ring 152 contact each other by a biasing force of the barrier opening spring 153. Therefore, the main barrier blade 154 is rotated interlocking with the rotational movement of the barrier drive ring 152 in the closing direction (barrier closing direction; the direction of the arrow 016 in FIG. 10).

As shown in FIGS. 4A and 4B, in the operation range 154h and 155e of the main barrier blade 154 and the sub barrier blade 155 respectively, a portion of the contacting surface 155b of the sub barrier blade 155 is located within the operation range 154h of the contacting surface 154d of the main barrier blade 154. Hence, wherever the sub barrier blade 155 is located within the operation range 155e thereof, the sub barrier blade 155 is rotated in the closing direction (barrier closing direction; the direction of the arrow 017 in FIG. 10) such that the contacting surface 155b thereof is pushed by the contacting surface 154d of the main barrier blade 154. Specifically, when the contacting surface 155b is pushed by the contacting surface 154d of the main barrier blade 154 that is rotated to a closed state by the barrier drive ring 152, the sub barrier blade 155 is rotated so as to be shifted from the open state to the closed state.

The above series of operations allow the main barrier blade 154 and the sub barrier blade 155 to be opened and closed interlocking with zooming of the lens barrel.

Figure 11A:
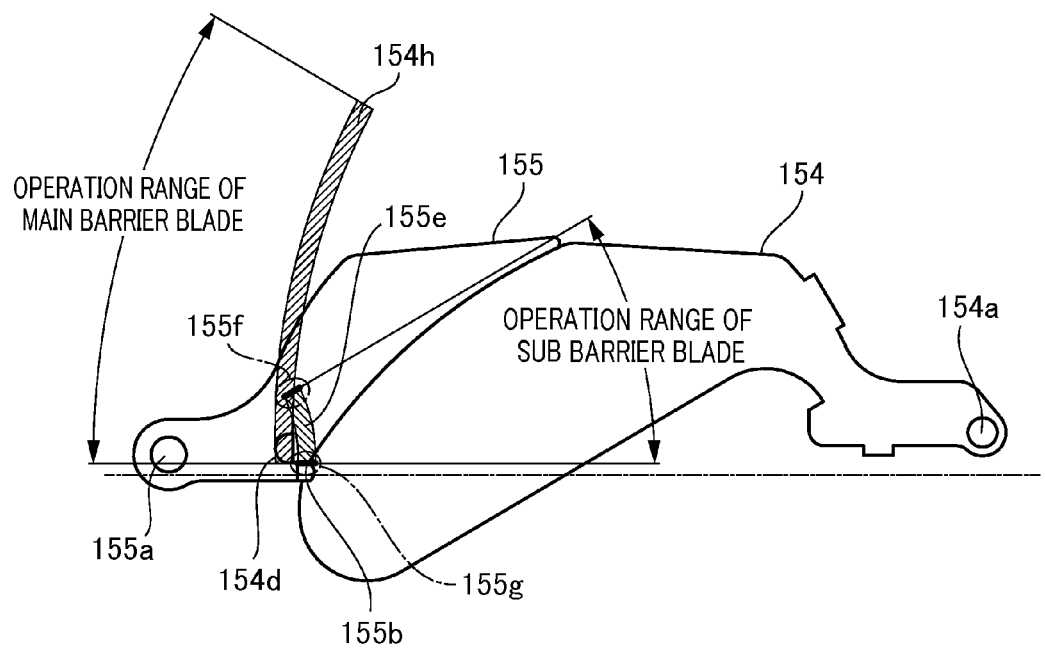
FIGS. 11A and 11B are views illustrating a configuration in which a portion of the contacting surface of a sub barrier blade is not located within the operation range of a main barrier blade.
Figure 11B:
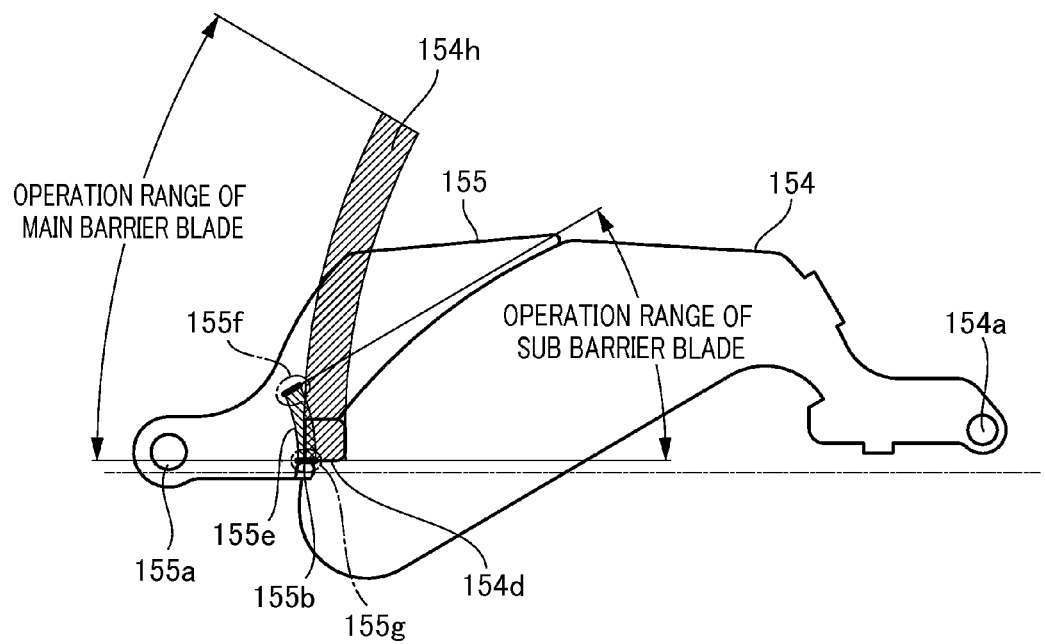

FIGS. 11A and 11B are views illustrating a configuration in which a portion of the contacting surface of the sub barrier blade is not located within the operation range of the main barrier blade. With the shape of the contacting portion shown in FIG. 11A, since the contacting surface 155b and the contacting surface 154d contact each other near the opening location 155f, the sub barrier blade 155 can be rotated in the closing direction, while, since they cannot contact each other near the closing location 155g, the sub barrier blade 155 cannot maintain the closed state. In addition, with the shape of the contacting portion shown in FIG. 11B, since the contacting surface 155b and the contacting surface 154d contact each other near the closing location 155g, the sub barrier blade 155 can maintain the closed state, while they do not contact each other near the opening location 155f. Consequently, the sub barrier blade 155 cannot be shifted to a closed state.

On the other hand, in the present embodiment, as explained with reference to FIGS. 4A and 4B, a portion of the contacting surface 155b of the sub barrier blade 155 is located within the operation range 154h of the contacting surface 154d of the main barrier blade 154. Therefore, the sub barrier blade 155 can be shifted from the open state to the closed state wherever it is located within the operation range 154h of the main barrier blade.

In addition, the sub barrier blade 155 is located above the contacting surface 154d of the main barrier blade 154 (in the optical axis direction on the object side) both in the open state and the closed state. This prevents the sub barrier blade 155 from falling in the first lens 101 side even when an external force is applied to it.

Further, the tip 154e of the main barrier blade 154 is located above the contacting surface 155b of the sub barrier blade 155 (in the optical axis direction on the object side) in the closed state of the barrier. Thus, a bayonet structure consists of the main barrier blade 154 and the sub barrier blade 155, the detachment of the sub barrier blade 155 can be prevented.

In the closed state, the action of the opening spring 153 makes the contacting surface 155b contact the contacting surface 154d, and also makes the contacting surface (third contacting surface) 155d provided at the blade tip of the sub barrier blade 155 contact the matching surface 154g of the main barrier blade 154. This can maintain the closed state. In addition, this can prevent the main barrier blade 154 from entering the center of the opening 157a because, when one of the main barrier blades 154 and/or the sub barrier blades 155 is forced to be opened in the closed state of the barrier, the other of the sub barrier blades 155 functions as a closing stopper for the main barrier blade 154.

Figure 12:
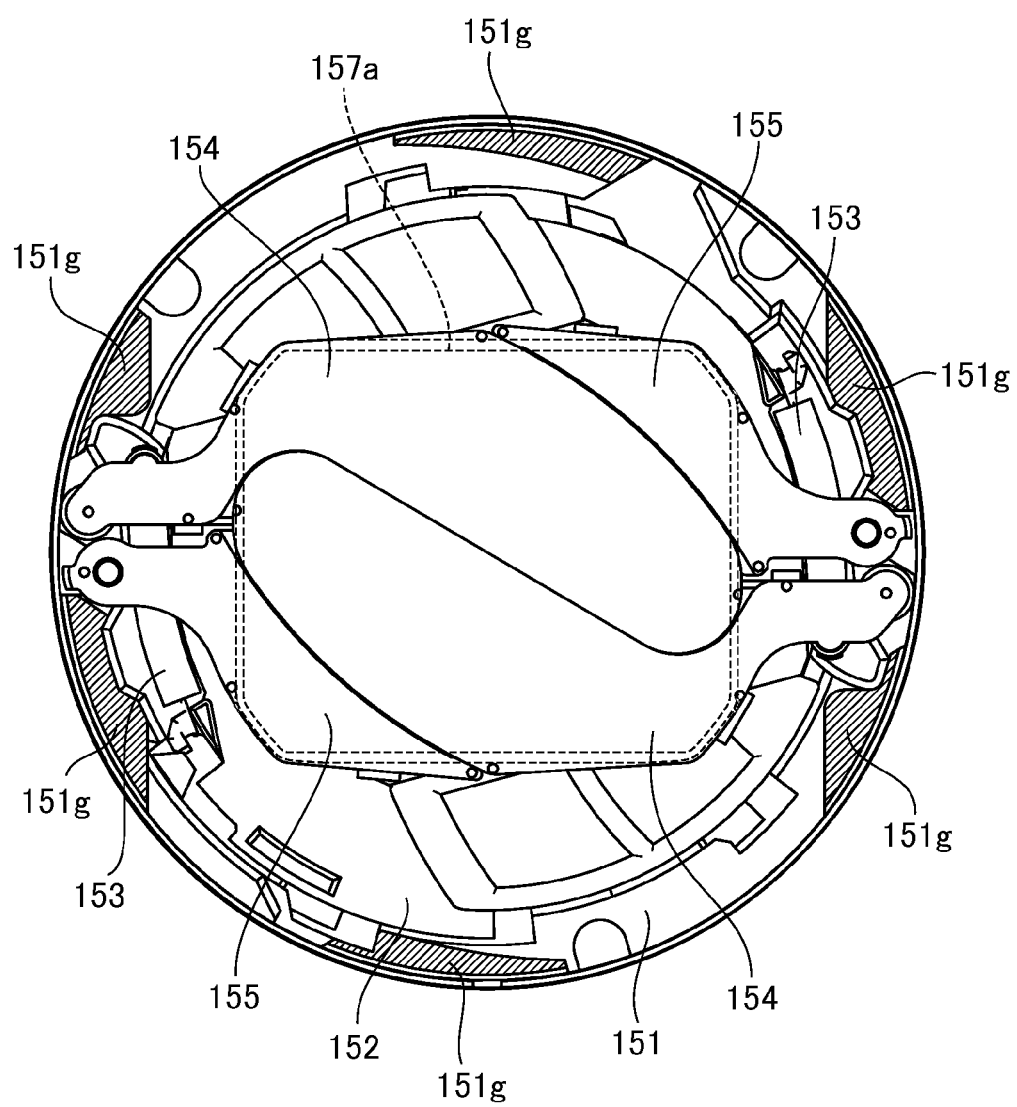
FIG. 12 is a view illustrating a shape formed by main barrier blades and sub barrier blades.

FIG. 12 is a view illustrating a shape formed by the main barrier blades and the sub barrier blades. As shown in FIG. 12, the shape formed by the main barrier blades 154 and the sub barrier blades 155 is approximately close to the shape of the opening 157a of the cap 157. This can minimize the shape of the barrier as well as maximize the area for the cap adhesion surface 151g of the barrier cylinder 151 as much as possible. Thus, the maximized area for the cap adhesion surface 151g can increase the adhesive strength of the cap 157.

The barrier device according to the present embodiment described above can eliminate the need of the closing springs corresponding to the main barrier blade and the sub barrier blade, and suppress an increase in the number of components. In addition, this barrier device does not require setting of the balance of the springs in this embodiment because the sub barrier blade 155 is not biased by rotation. This can reduce the cost and further improve the assemblability. In addition, with this barrier device, when the device is shifted from the open state to the closed state, the sub barrier blade 155 is rotated in the barrier closing direction such that the contacting surface 155b thereof is pushed by the contacting surface 154d of the main barrier blade 154. This can avoid the unnecessary friction between the main barrier blade and the sub barrier blade.

Figure 13:
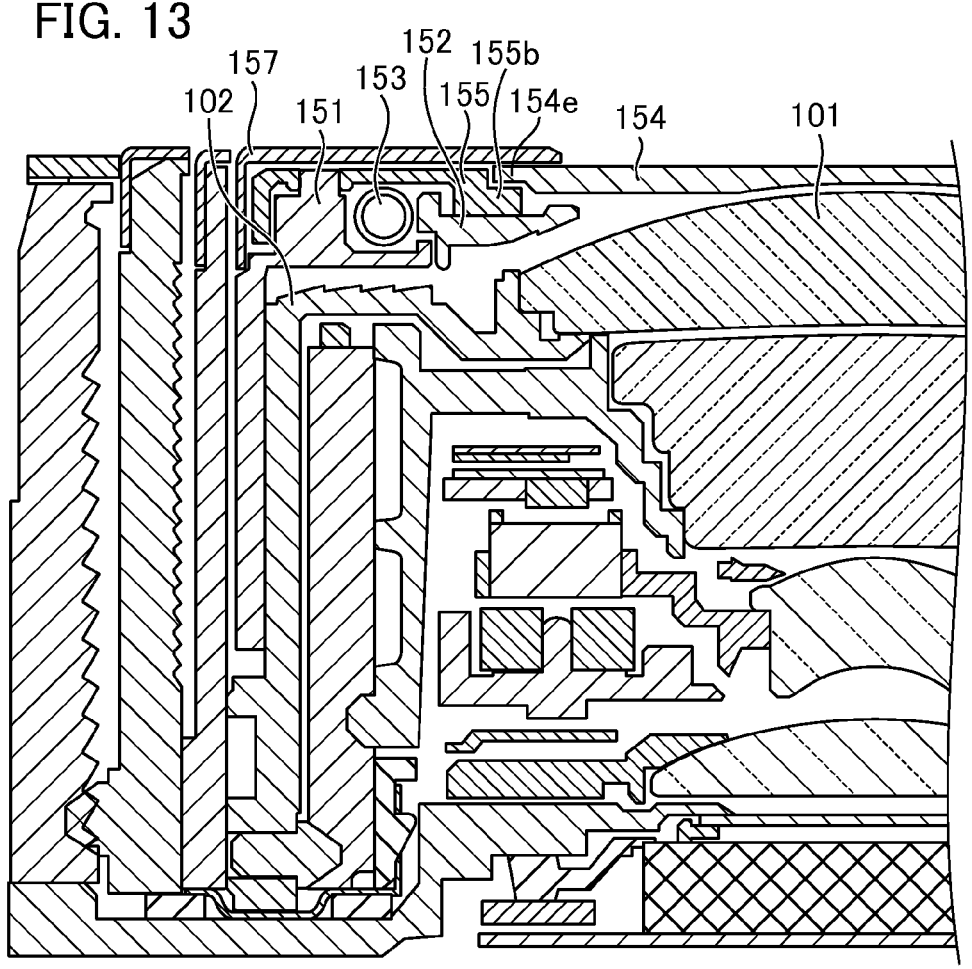
FIG. 13 is a cross-sectional view of a sub barrier blade.
Figure 14:
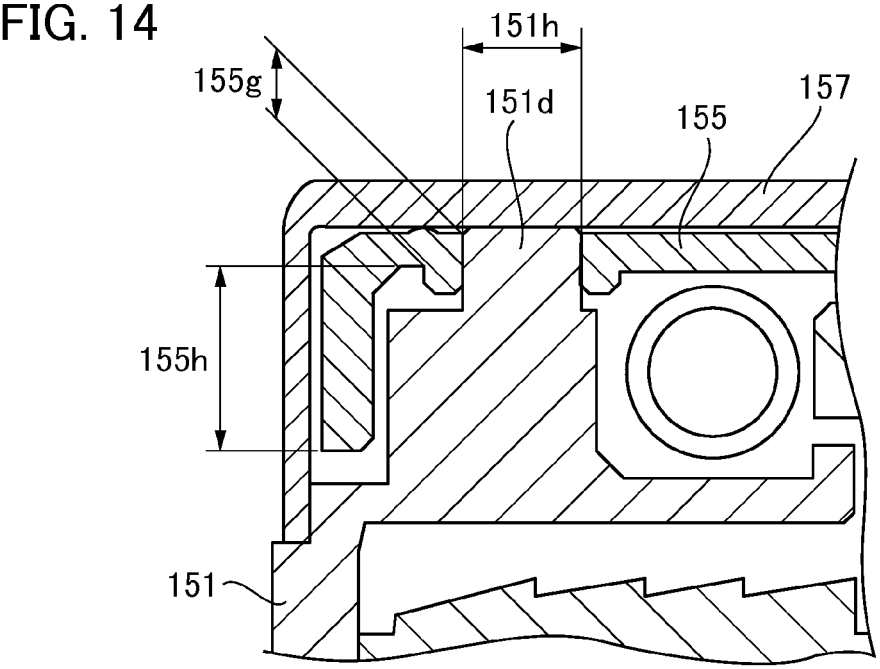
FIG. 14 is an enlarged view near the rotary shaft of a sub barrier blade.

Here, the fitting between the sub barrier blade 155 and the barrier cylinder 151 will be described. FIG. 13 is a cross-sectional view of the sub barrier blade. FIG. 14 is an enlarged view near the rotary shaft of the sub barrier blade. As described above, the sub barrier blade 155 has the rotation hole 155a. The rotation hole 155a is fit to the rotary shaft 151d included in the barrier cylinder 151. Therefore, only a fitting length 155g that corresponds to the thickness of the barrier blade 155 can be secured for the fitting length between the rotary shaft 151d and the rotation hole 155a at the most. Consequently, when the sub barrier blade 155 is assembled into the barrier cylinder 151, the sub barrier blade 155 is very easily detached because the fitting length is short.

Figure 15:
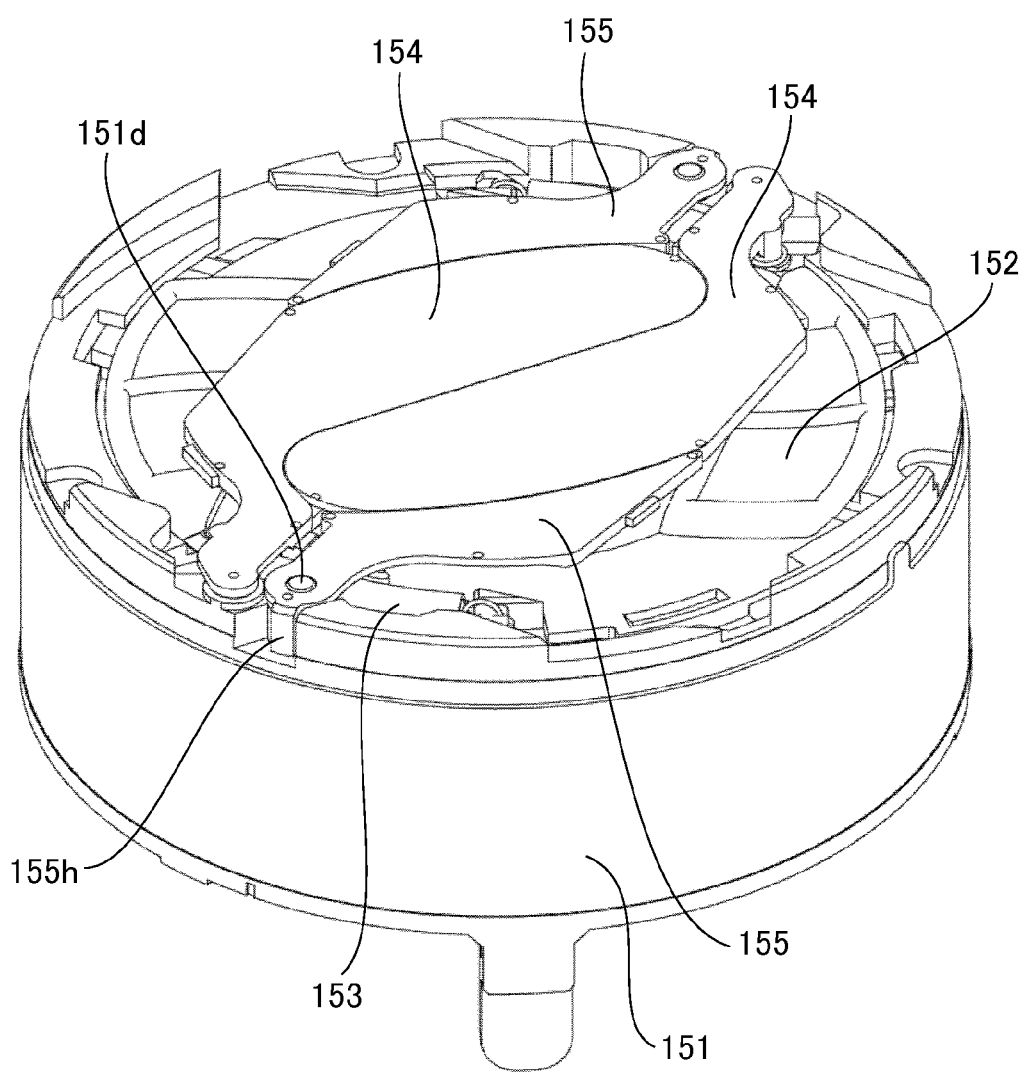
FIG. 15 is a perspective view of a barrier group in a closed state.

However, in the present embodiment, as shown in FIG. 15, the sub barrier blade 155 has a longitudinal portion 155h extending in the rotary shaft direction (optical axis direction) thereof which portion is longer than the fitting length 155g. Therefore, when the sub barrier blade 155 is assembled into the barrier cylinder 151, the effect of the longitudinal portion 155h can decrease the possibility of the careless detachment of the blade.

The longitudinal portion 155h is disposed on the opposite side from the optical axis across the rotary shaft 151d. This can secure the space at the center of the lens barrel, and therefore can reduce the size of the outer diameter of the lens barrel when the diameter of the first lens 101 becomes larger as the angle of the lens is wilder.

In addition, this configuration can improve the assemblability of the barrier blade having a configuration in which the fitting length 155g is shorter than the rotary shaft diameter 151h of the barrier cylinder 151 for the sub barrier blade 155.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2013-012999 filed on Jan. 28, 2013, which is hereby incorporated by reference herein in its entirety.

What is claimed is:

1. A barrier device comprising:
a first shielding member configured to be shifted between a closed state in which a lens is shielded and an open state in which the lens is exposed;
a second shielding member configured to be shifted between the closed state and the open state; and
a driving member configured to drive the first shielding member to be shifted to the closed or open state,
wherein in a case where the first and second shielding members are shifted between the closed state and the open state, the first and second shielding members are rotated in opposite directions,
wherein the first shielding member has a first tip portion, a first matching surface, and a first contacting portion,
wherein the second shielding member has a second tip portion, a second matching surface, and a second contacting portion,
wherein in a case where the first and second shielding members are in the closed state, (a) the first contacting portion contacts the second contacting portion and (b) the second tip portion contacts the first matching surface,
wherein in a case where the first and second shielding members are shifted from the closed state to the open state, the first tip portion pushes the second matching surface in a state that the first contacting portion is overlapped with a part of the second shielding member, and
wherein in a case where the first and second shielding members are in the open state, (a) the first tip portion contacts the second matching surface and (b) the first contacting portion is overlapped with the second tip portion.

2. The barrier device according to claim 1, further comprising:
an urging member which is provided between the first shielding member and the driving member and which is configured to urge the first shielding member to the open state.

3. The barrier device according to claim 1, further comprising:
a shielding cylinder configured to rotatably hold the first and second shielding members, wherein the shielding cylinder has a rotary shaft that is fit into a rotation hole provided on the second shielding member, and wherein the second shielding member has a longitudinal portion longer in the optical axis direction than a fitting length between the rotary shaft and the rotation hole.

4. A lens barrel comprising:

a first shielding member configured to be shifted between a closed state in which a lens is shielded and an open state in which the lens is exposed;

a second shielding member configured to be shifted between the closed state and the open state; and a driving member configured to drive the first shielding member to be shifted to the closed or open state, wherein in a case where the first and second shielding members are shifted between the closed state and the open state, the first and second shielding members are rotated in opposite directions, wherein the first shielding member has a first tip portion, a first matching surface, and a first contacting portion, wherein the second shielding member has a second tip portion, a second matching surface, and a second contacting portion, wherein in a case where the first and second shielding members are in the closed state, (a) the first contacting portion contacts the second contacting portion and (b) the second tip portion contacts the first matching surface, wherein in a case where the first and second shielding members are shifted from the closed state to the open state, the first tip portion pushes the second matching surface in a state that the first contacting portion is overlapped with a part of the second shielding member, and wherein in a case where the first and second shielding members are in the open state, (a) the first tip portion contacts the second matching surface and (b) the first contacting portion is overlapped with the second tip portion.

5. The lens barrel according to claim 4, further comprising:

an urging member which is provided between the first shielding member and the driving member and which is configured to urge the first shielding member to the open state.

6. The lens barrel according to claim 4, further comprising:

a shielding cylinder configured to rotatably hold the first and second shielding members, wherein the shielding cylinder has a rotary shaft that is fit into a rotation hole provided on the second shielding member, and wherein the second shielding member has a longitudinal portion longer in the optical axis direction than a fitting length between the rotary shaft and the rotation hole.

7. An imaging apparatus comprising:

a first shielding member configured to be shifted between a closed state in which a lens is shielded and an open state in which the lens is exposed;

a second shielding member configured to be shifted between the closed state and the open state; and a driving member configured to drive the first shielding member to be shifted to the closed or open state, wherein in a case where the first and second shielding members are shifted between the closed state and the open state, the first and second shielding members are rotated in opposite directions, wherein the first shielding member has a first tip portion, a first matching surface, and a first contacting portion, wherein the second shielding member has a second tip portion, a second matching surface, and a second contacting portion, wherein in a case where the first and second shielding members are in the closed state, (a) the first contacting portion contacts the second contacting portion and (b) the second tip portion contacts the first matching surface, wherein in a case where the first and second shielding members are shifted from the closed state to the open state, the first tip portion pushes the second matching surface in a state that the first contacting portion is overlapped with a part of the second shielding member, and wherein in a case where the first and second shielding members are in the open state, (a) the first tip portion contacts the second matching surface and (b) the first contacting portion is overlapped with the second tip portion.

8. The imaging apparatus according to claim 7, further comprising:

an urging member which is provided between the first shielding member and the driving member and which is configured to urge the first shielding member to the open state.

9. The imaging apparatus according to claim 7, further comprising:

a shielding cylinder configured to rotatably hold the first and second shielding members, wherein the shielding cylinder has a rotary shaft that is fit into a rotation hole provided on the second shielding member, and wherein the second shielding member has a longitudinal portion longer in the optical axis direction than a fitting length between the rotary shaft and the rotation hole.

* * * * *